(12) United States Patent
Biswas et al.

(10) Patent No.: US 8,977,817 B2
(45) Date of Patent: Mar. 10, 2015

(54) SYSTEM CACHE WITH FINE GRAIN POWER MANAGEMENT

(71) Applicant: Apple Inc., Cupertino, CA (US)

(72) Inventors: Sukalpa Biswas, Fremont, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 13/629,894

(22) Filed: Sep. 28, 2012

(65) Prior Publication Data

US 2014/0095777 A1 Apr. 3, 2014

(51) Int. Cl.
*G06F 12/08* (2006.01)
*G06F 1/32* (2006.01)

(52) U.S. Cl.
CPC .......... *G06F 1/3287* (2013.01); *G06F 12/0802* (2013.01)
USPC ............ 711/129; 711/E12.018; 711/E12.041; 713/324

(58) Field of Classification Search
None
See application file for complete search history.

(56) References Cited

U.S. PATENT DOCUMENTS

| | | | |
|---|---|---|---|
| 5,761,715 A * | 6/1998 | Takahashi | 711/128 |
| 7,412,570 B2 * | 8/2008 | Moll et al. | 711/147 |
| 7,516,274 B2 * | 4/2009 | Moll et al. | 711/118 |
| 7,689,772 B2 * | 3/2010 | Damaraju et al. | 711/128 |
| 7,899,990 B2 * | 3/2011 | Moll et al. | 711/118 |
| 7,904,659 B2 * | 3/2011 | Moll et al. | 711/135 |
| 7,958,312 B2 * | 6/2011 | Moll et al. | 711/135 |
| 8,020,014 B2 * | 9/2011 | Priel et al. | 713/320 |
| 8,225,046 B2 * | 7/2012 | Licht et al. | 711/128 |
| 8,285,936 B2 * | 10/2012 | Roberts et al. | 711/118 |
| 8,412,971 B2 * | 4/2013 | Branover et al. | 713/324 |
| 8,635,408 B2 * | 1/2014 | Levenstein et al. | 711/137 |
| 8,656,108 B2 * | 2/2014 | Licht et al. | 711/128 |
| 2002/0112126 A1 * | 8/2002 | Hayakawa et al. | 711/128 |
| 2005/0086435 A1 * | 4/2005 | Todoroki | 711/128 |
| 2007/0113015 A1 * | 5/2007 | Moll et al. | 711/135 |
| 2007/0130382 A1 * | 6/2007 | Moll et al. | 710/22 |
| 2007/0186057 A1 * | 8/2007 | Moll et al. | 711/146 |
| 2007/0214323 A1 * | 9/2007 | Moll et al. | 711/135 |
| 2007/0260818 A1 * | 11/2007 | Damaraju et al. | 711/128 |
| 2008/0082753 A1 * | 4/2008 | Licht et al. | 711/128 |
| 2008/0209248 A1 * | 8/2008 | Priel et al. | 713/340 |
| 2009/0132764 A1 * | 5/2009 | Moll et al. | 711/118 |
| 2009/0172283 A1 * | 7/2009 | Khellah et al. | 711/118 |
| 2010/0122031 A1 | 5/2010 | Strumpen et al. | |
| 2011/0093654 A1 | 4/2011 | Roberts et al. | |
| 2011/0283071 A1 | 11/2011 | Yokoya et al. | |
| 2011/0283124 A1 * | 11/2011 | Branover et al. | 713/323 |
| 2012/0096295 A1 | 4/2012 | Krick | |
| 2012/0173907 A1 * | 7/2012 | Moses et al. | 713/321 |
| 2012/0284462 A1 * | 11/2012 | Licht et al. | 711/128 |
| 2013/0036270 A1 * | 2/2013 | Dreslinski et al. | 711/128 |
| 2013/0219205 A1 * | 8/2013 | Licht et al. | 713/324 |
| 2013/0227321 A1 * | 8/2013 | Branover et al. | 713/322 |
| 2014/0095896 A1 * | 4/2014 | Carter et al. | 713/300 |

* cited by examiner

*Primary Examiner* — Kevin Verbrugge
(74) *Attorney, Agent, or Firm* — Rory D. Rankin; Meyertons, Hood, Kivlin, Kowert & Goetzel, P.C.

(57) ABSTRACT

Methods and apparatuses for reducing leakage power in a system cache within a memory controller. The system cache is divided into multiple small sections, and each section is supplied with power from a separately controllable power supply. When a section is not being accessed, the voltage supplied to the section is reduced to a voltage sufficient for retention of data but not for access. Incoming requests are grouped together based on which section of the system cache they target. When enough requests that target a given section have accumulated, the voltage supplied to the given section is increased to a voltage sufficient for access. Then, once the given section has enough time to ramp-up and stabilize at the higher voltage, the waiting requests may access the given section in a burst of operations.

23 Claims, 9 Drawing Sheets

SYSTEM CACHE WITH FINE GRAIN POWER MANAGEMENT

BACKGROUND

1. Field of the Invention

The present invention relates generally to data caches, and in particular to methods and mechanisms for optimizing a system cache located in a memory controller.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

Conventional caches are typically coupled to or nearby a processor and store data that is frequently accessed by the processor to reduce latency. In a conventional cache, data may be retained in the cache based on the temporal locality of accesses. For example, when a line is allocated in the cache, the more times the line is referenced, the more difficult it becomes to have this line replaced. However, conventional caches are not designed for storing data that is accessed multiple times when the accesses are widely spaced in time. Such data would tend to get evicted in a traditional cache.

SUMMARY

Systems, memory controllers, caches, and methods for reducing leakage power in a system cache are disclosed. In a system on chip, multiple agents may be coupled to a memory controller which in turn may be coupled to one or more memory devices. The multiple agents may access the memory device(s) via the memory controller. The memory controller may include a system cache configured to store data for the purposes of reducing the number of requests that access off-chip memory.

The system cache may be shared by multiple agents with different types of access patterns than a typical processor cache would experience. Some cache lines may be referenced multiple times but they may not be referenced in a temporally local fashion. The system cache may not know which lines will be reused, and so a requesting agent may determine how lines are allocated in the system cache.

In one embodiment, to reduce the power leakage of the system cache, the system cache may be divided into multiple small sections and the power supplied to each section may be controlled independently of the other sections. If a section is inactive, then the voltage supplied to the inactive section may be reduced to a first voltage sufficient for retention. Prior to being accessed, the voltage supplied to the section may be increased to a second voltage which is higher than the first voltage.

In various embodiments, requests may be grouped together based on which section of the system cache they reference. When an inactive section is activated, after the delay to allow the section to be activated, the grouped together requests may access the section in a burst.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
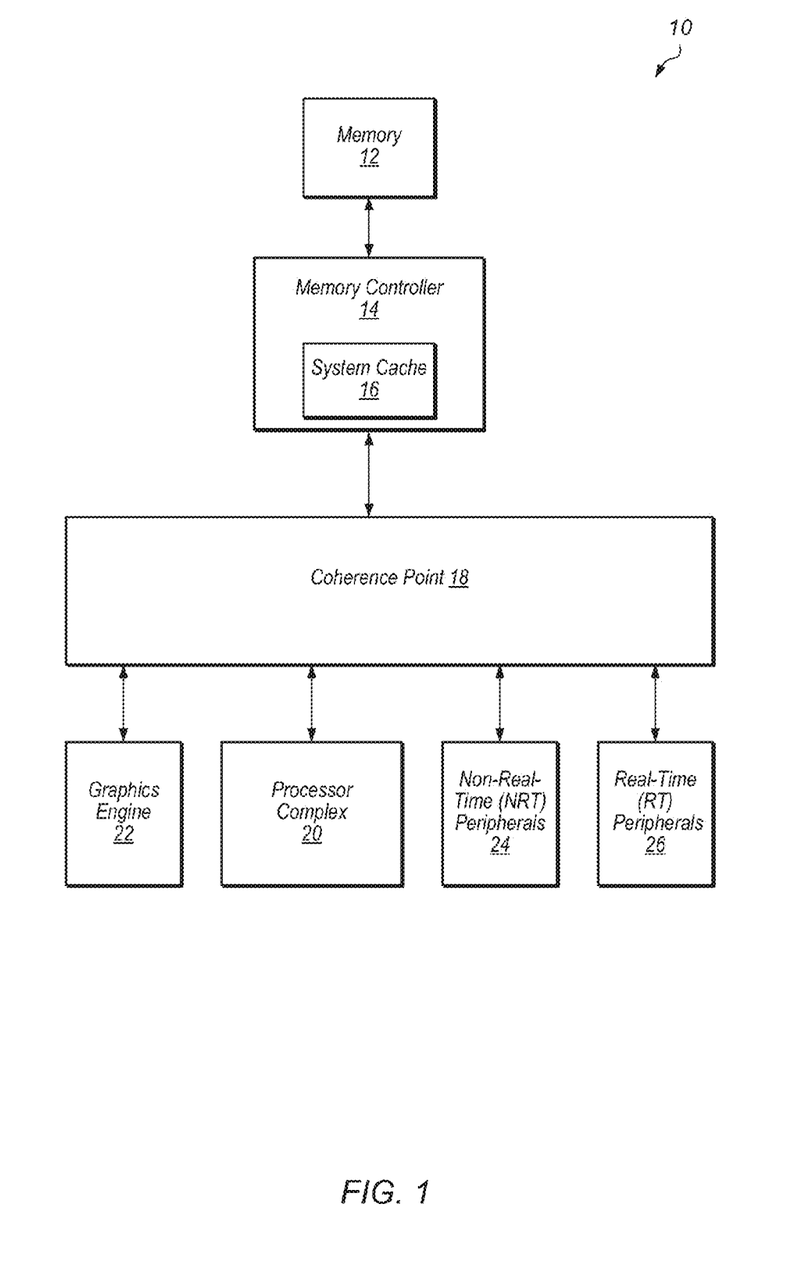
FIG. 1 illustrates one embodiment of a portion of an electronic device.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. For example, in one scenario, geometry data may be provided to processor complex 20, and this geometry data may be translated to a data structure that a 3D engine inside graphics engine 22 can understand. After the translation is performed, the 3D engine may reference the translated data structure multiple times within a single frame. Therefore, the translated data structure may be allocated in system cache 16 as sticky to ensure that the cache lines storing the data structure are not replaced in system cache 16 by other data. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
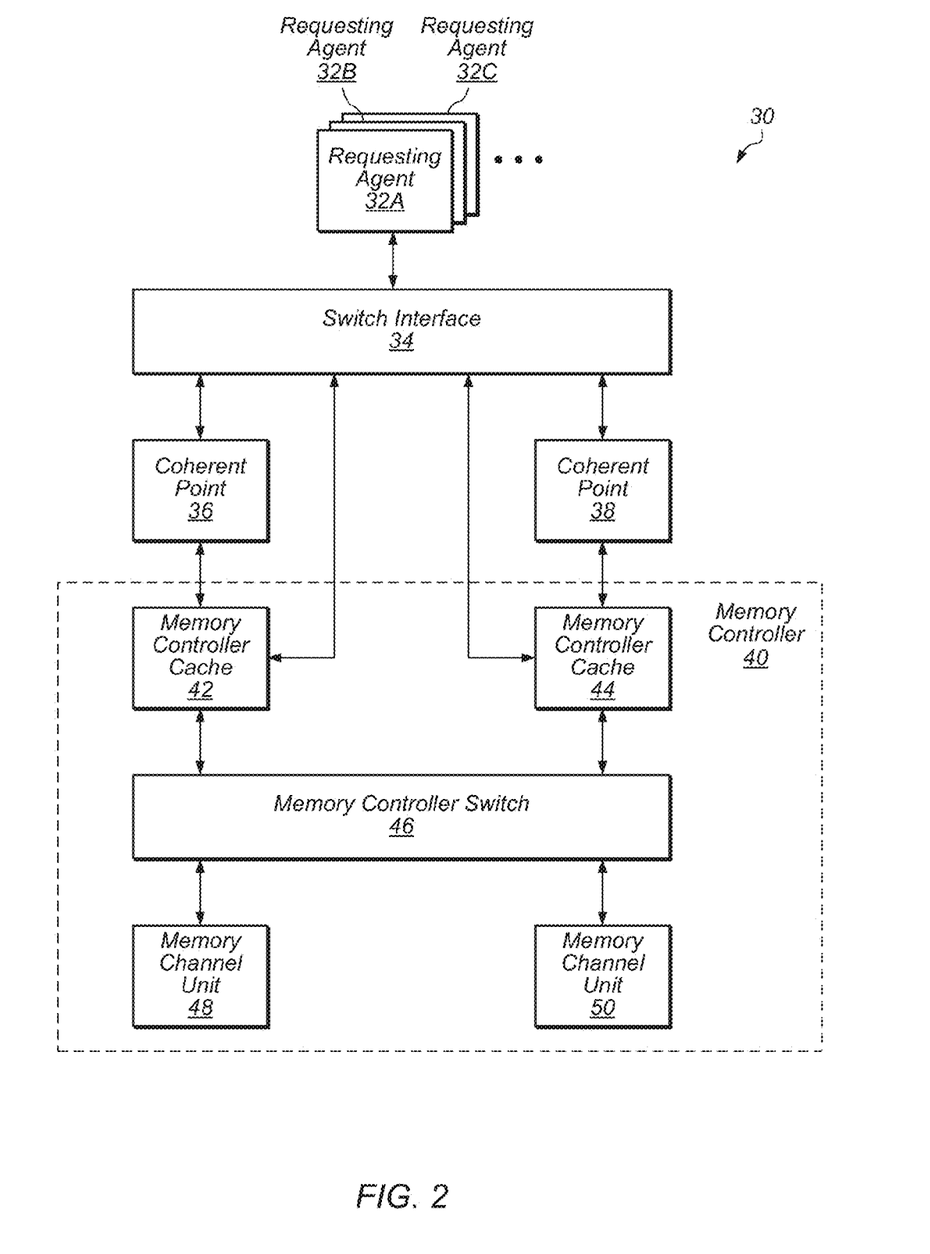
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherent point 36 and memory requests that reference the address space of cache 44 may be routed by switch interface 34 to cache 44 via coherent point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field. The group ID field may be used to identify the dataflow source of the request which caused the cache line to be allocated in the cache. In one embodiment, cache lines that are allocated as sticky may be retained until the cache receives a software command to clear the sticky allocation. Each cache 42 and 44 may be configured to implement a replacement policy for existing cache lines, but the replacement policy may exclude the sticky lines from being considered for replacement. A cache line may be allocated as sticky for a request that misses in the cache if the request includes a sticky allocation hint. A requesting agent may make the determination that a specific request should have a sticky allocation hint, and the requesting agent may base the determination on whether the data referenced by the specific request is likely to be used by subsequent requests.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
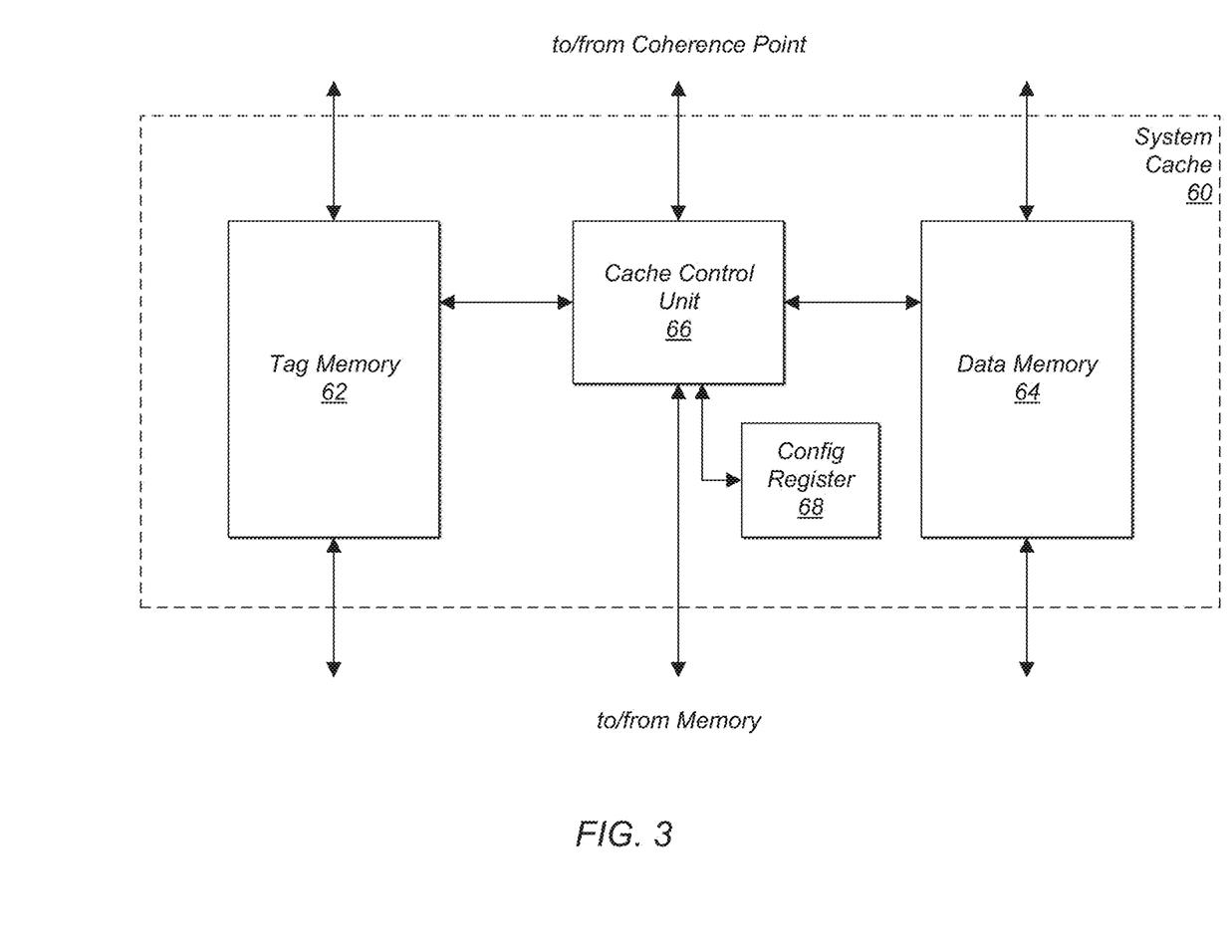
FIG. 3 is a block diagram illustrating one embodiment of a system cache.

Referring now to FIG. 3, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 3. For example, in other embodiments, system cache 60 may include arbitration circuitry to arbitrate among requests. It is to be understood that the system cache architecture shown in FIG. 3 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 3 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and clearance policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60. In one embodiment, there may be a quota counter (not shown) for each group ID in the cache control unit 66. The quota counter may keep track of the number of cache lines in system cache 60 for the corresponding group ID. The replacement policy may specify if the given group ID can replace its own sticky lines with new sticky lines. In one embodiment, this replacement policy may be indicated using a sticky replacement configuration option indicator. This replacement policy may only be carried out if there are no available non-sticky cache line storage locations in system cache 60 for the new sticky line.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

In one embodiment, cache control unit 66 may determine if there is an available entry in data memory 64 in response to receiving a sticky transaction from a requesting agent. If the transaction is sticky and a cache miss, and there is an available non-sticky entry in data memory 64, then a new sticky entry may be allocated for the transaction, replacing the available non-sticky entry. If the transaction is sticky and a cache hit to a non-sticky entry, the non-sticky entry may not be converted to sticky by this hit. In another scenario, if a non-sticky transaction hits on a sticky entry, then the sticky entry may remain sticky.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

In one embodiment, a cache line may be initially allocated for a non-sticky transaction by a particular requesting agent. The particular requesting agent for which the cache line was initially allocated may be considered the primary user of that line. Any subsequent hits by other group IDs to this entry may be considered secondary users, and therefore, the original non-sticky state may be maintained for the cache line, even if subsequent hits for the cache line are for sticky transactions.

In one embodiment, a cache line with a sticky state allocated for a first group ID may be hit by a sticky transaction for a second group ID. In this scenario, the group ID of the tag entry corresponding to the cache line may be changed to the second group ID. In other words, the second group ID may inherit the cache line from the first group ID. This mechanism for inheriting cache lines may be useful in certain graphics processing applications, when data for a previous frame may be used again for the next frame. To facilitate the reuse of this data, the ownership of the cache line may be transferred from the first group ID to the second group ID.

In some embodiments, ownership of cache lines may be transferred from a first group ID to a second group ID via a software command sent to cache control unit 66. The software command may specify that all cache lines that are assigned to the first group ID be transferred to the second group ID. This feature may prove beneficial in many applications, including graphics applications.

Figure 4:
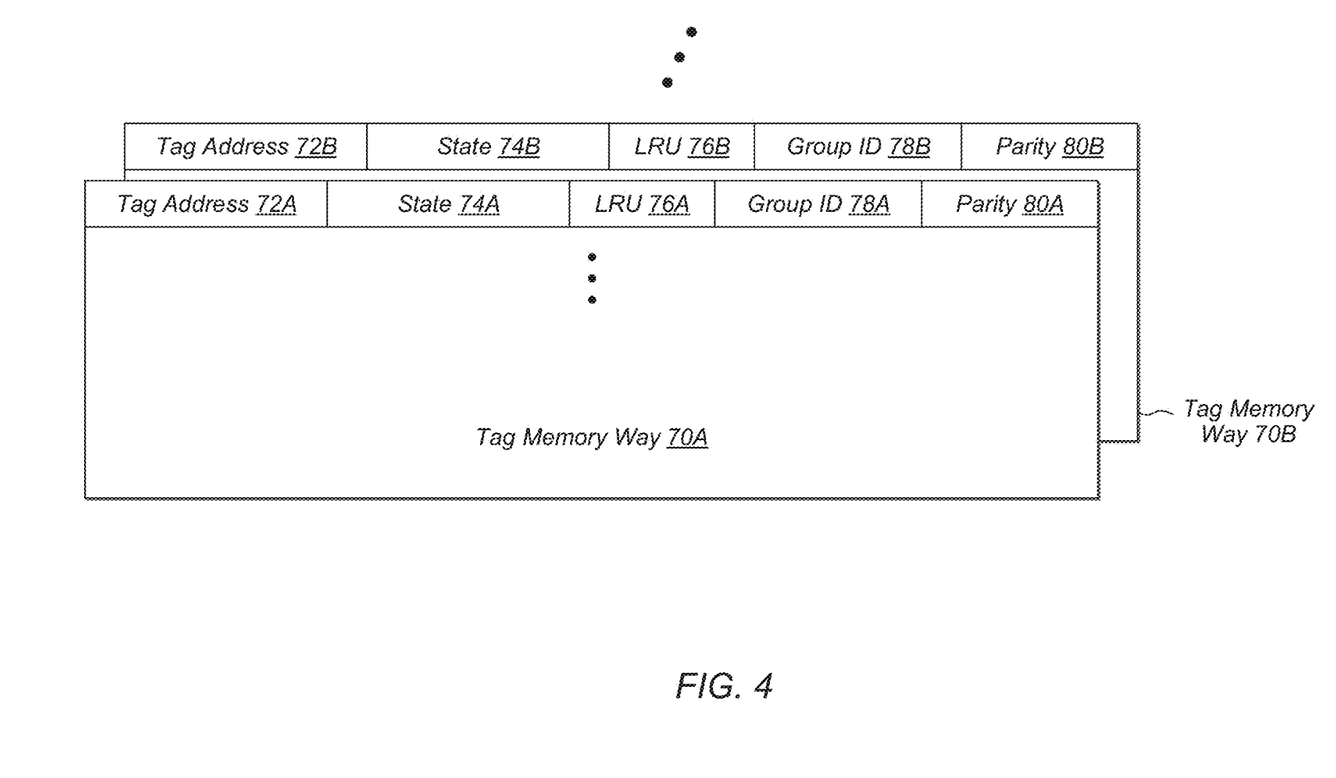
FIG. 4 is a block diagram illustrating one embodiment of a pair of tag memory ways.

Turning now to FIG. 4, a block diagram of one embodiment of a pair of tag memory ways is shown. Tag memory ways 70A-B are representative of any number of ways that may be included within a tag memory, such as tag memory 62 (of FIG. 3). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The clean/dirty status of a cache line may be conveyed along with the transaction to the system cache by the requesting agent. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

In one embodiment, the only way to remove sticky data is for the system cache to receive a software command indicating that certain sticky data for a specific group ID may be removed. In another embodiment, sticky data for a first group ID may be removed from the system cache by other sticky data from the first group ID based on the settings of a corresponding configuration register. If the setting in the configuration register for a specific group ID indicates that this group ID may replace sticky lines with other sticky lines, then a sticky line may be replaced by another sticky line for this group ID.

In some embodiments, ownership of sticky lines may be transferred from one group ID to another group ID. This transfer of ownership may be utilized in various scenarios in which data may be initially used by a first group ID and then later by a second group ID. For example, in a graphics application, certain data may be used to build one frame. A first agent using a first group ID may initially allocate data for this graphics frame. Then, a second agent using a second group ID may reuse the data for the next frame of the graphics application. The software may generate a request to transfer ownership of the frame data from the first group ID to the second group ID. The system cache may receive this software request and as a result may pass ownership from the first group to the second group while keeping the data as sticky. Also, textures that are used in a current phase of a three-dimensional (3D) graphics application may be reused for the next phase. There may be an overlap between the 3D phases, like certain boundary tiles, and these tiles may be transferred between group IDs for consecutive phases. It is noted that the transfer of ownership of cache lines between group IDs may also occur in a variety of other applications besides just graphics applications.

Allocating a line in the system cache with a sticky state will result in the line being retained in the system cache even if the amount of time in between accesses to the sticky line is large.

For example, certain data may be accessed frequently, but there may be a long duration of time between accesses. This data may be placed in the system cache with the state 74 set to sticky. Therefore, the data will remain in the system cache regardless of how long the duration of time is between accesses. For example, a first cache line may be allocated as sticky in the system cache, and a length of time may elapse such that all other lines in the cache may either be replaced or accessed at least once prior to the first cache line being accessed again. If a new line needs to be allocated in the cache, the new line will take the place of one of the non-sticky lines in the cache, even if the non-sticky line has been accessed more recently than the first cache line. The first cache line may remain in the cache even if it is the least recently accessed line in the cache. This is in contrast with a traditional cache, where most recently accessed lines are retained in the cache, and the lines that have not been accessed for a long period of time are replaced.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 5:
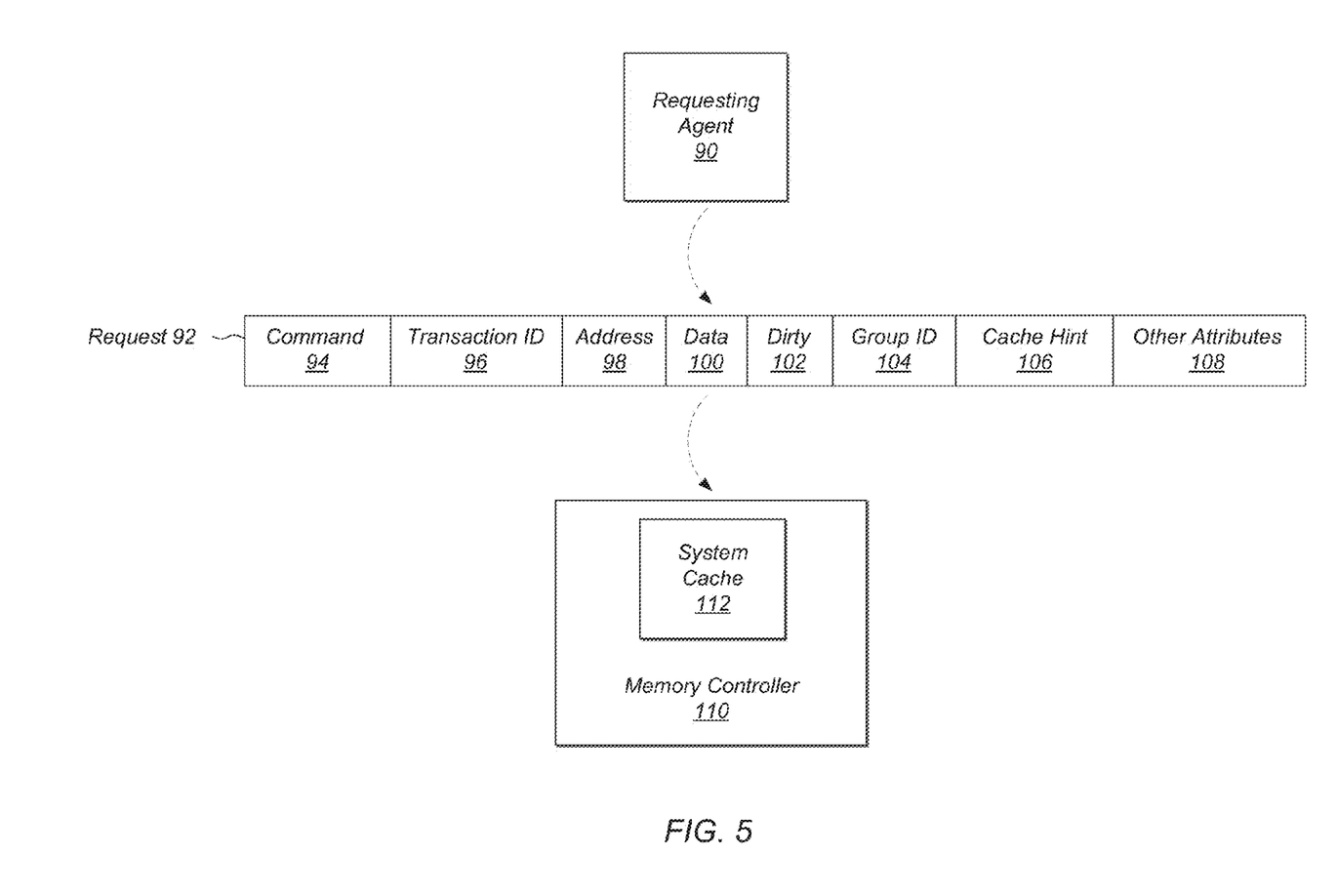
FIG. 5 illustrates one embodiment of a requesting agent conveying a request to a system cache.

Referring now to FIG. 5, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherent point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 112. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 112. Other attributes 108 are representative of any number and type of additional attributes (e.g., coherency, QoS attribute, size of the request, requestor ID, speculative status) which may be part of request 92. It is noted that in other embodiments, request 92 may be structured differently, with one or more additional fields not shown in FIG. 5 and/or one or more of the fields shown omitted.

Although system cache 112 is shown as a single unit, it should be understood that in other embodiments, system cache 112 may be split up into two or more separate units. For example, in another embodiment, memory controller 110 may include two channels and system cache 112 may be split up into two separate physical system caches. In this embodiment, the two separate physical system caches may be managed as one logical system cache.

Figure 6:
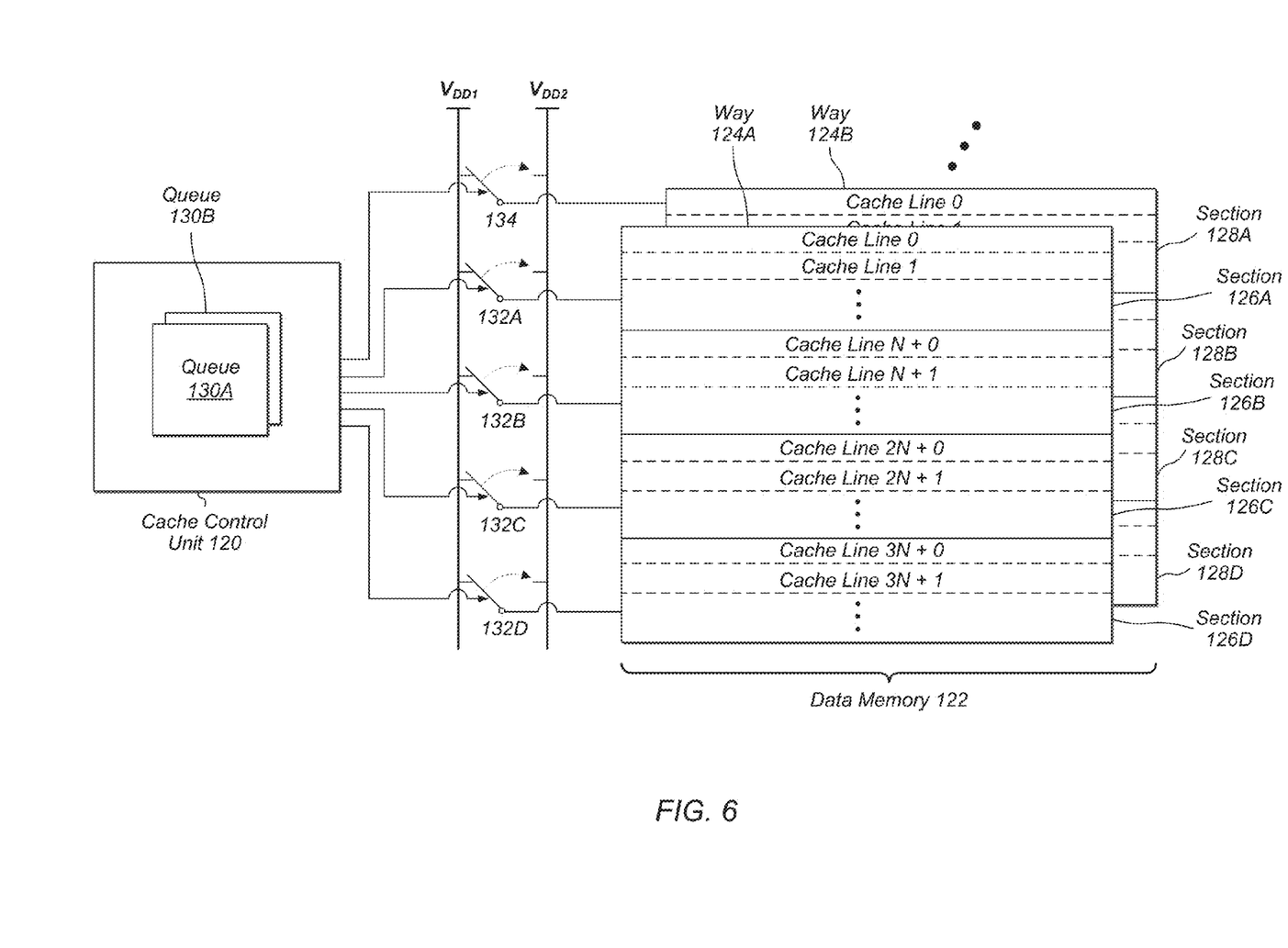
FIG. 6 is a block diagram illustrating one embodiment of a data memory divided into sections.

Turning now to FIG. 6, one embodiment of a system cache data memory divided into sections is shown. Data memory 122 includes ways 124A-B, which are representative of any number of ways of data memory 122. Each way 124A-B may be divided into four sections as shown in FIG. 6. Way 124A is divided into sections 126A-D and way 124B is divided into sections 128A-D. The number of cache lines per section may vary, depending on the embodiment. In other embodiments, each way may be divided into other numbers of sections. It is noted that a "section" may also be referred to as a "bank". In one embodiment, data memory 122 may be a static random-access memory (SRAM). In other embodiments, data memory 122 may be other types of memory.

Each section 126A-D and 128A-D may be coupled to two independent power supplies ($V_{DD1}$) and ($V_{DD2}$) via independently controllable switches. Switches 132A-D and switch 134A are shown in FIG. 6, and each of these switches may be controlled by cache control unit 120. The switches used to control the voltage supplied to sections 128B-D are not shown to avoid cluttering the figure. Although switches 132A-D and switch 134A are shown as analog switches, this is for illustrative purposes only. In other embodiments, switches 132A-D and switch 134A may be digital switches. For example, in another embodiment, cache control unit 120 may send a separate control code to each separate power supply to program the output voltage which is supplied to each section 126A-D and 128A-D of data memory 122. Other techniques for controlling and adjusting the voltage supplied to each section of data memory 122 are possible and are contemplated.

The voltage provided to each section may be determined by cache control unit 120 based on whether the specific section is being accessed or is on the verge of being accessed. If a section is being accessed, the voltage supplied to the section may be the higher supply voltage ($V_{DD1}$) which allows the data in the section to be read or written. If a section is not being accessed, the voltage supplied to the section may be the lower supply voltage ($V_{DD2}$) which allows the data in the section to be retained but does not allow data to be read from or written to the section. In one embodiment, for a specific type of system cache architecture, ($V_{DD1}$) may be 1.8 volts while ($V_{DD2}$) may be 1.3 volts. In other embodiments, the actual voltage of the two supply voltages ($V_{DD1}$) and ($V_{DD2}$) may vary.

By controlling each section independently, the leakage power lost by the overall system cache may be significantly reduced. When a given section is being accessed, the supply voltage ($V_{DD1}$) may be higher and so the leakage power may be greater during this time. However, when the given section is no longer being accessed, the supply voltage may be reduced to a retention voltage ($V_{DD2}$) to reduce the leakage power lost. After a period of time of inactivity, the given section may need to be accessed again, and in preparation for this, cache control unit 120 may switch the supply voltage to the higher voltage ($V_{DD1}$). Cache control unit 120 may allow for a grace period to elapse so that the given section has a chance to ramp-up to the higher supply voltage ($V_{DD1}$). Since the sections tend to be small, with the exact size of each section dependent on the embodiment, the ramp-up time should be short because the capacitive load of the section is relatively small. Generally speaking, the smaller the size of the section, the less the capacitive load which translates to a shorter ramp-up time.

Incoming requests that hit in the system cache may be combined into affinity groups in cache control unit 120. Requests that target the same section of data memory 122 may be stored in the same queue of queues 130A-B. Queues 130A-B are representative of any number of queues that may be located within cache control unit 120. In other embodiments, queues 130A-B may be located elsewhere in the overall system cache. In one embodiment, queue 130A may be assigned to store requests that are accumulating and which target the same section of the data memory 122. After the number of requests reaches a predetermined threshold, the requests may be written from queue 130A into the target section. Then, after queue 130A has been emptied, queue 130A may be used to store requests that are accumulating and which target a different section of data memory 122. In this way, a given queue may rotate through the different sections of data memory 122 as requests accumulate for the different sections. Alternatively, in another embodiment, cache control unit 120 may include a queue for each section of data memory 122 in a one-to-one mapping. In this embodiment, each queue 130A-B may be configured to store requests for a specific section and for that section only.

Figure 7:
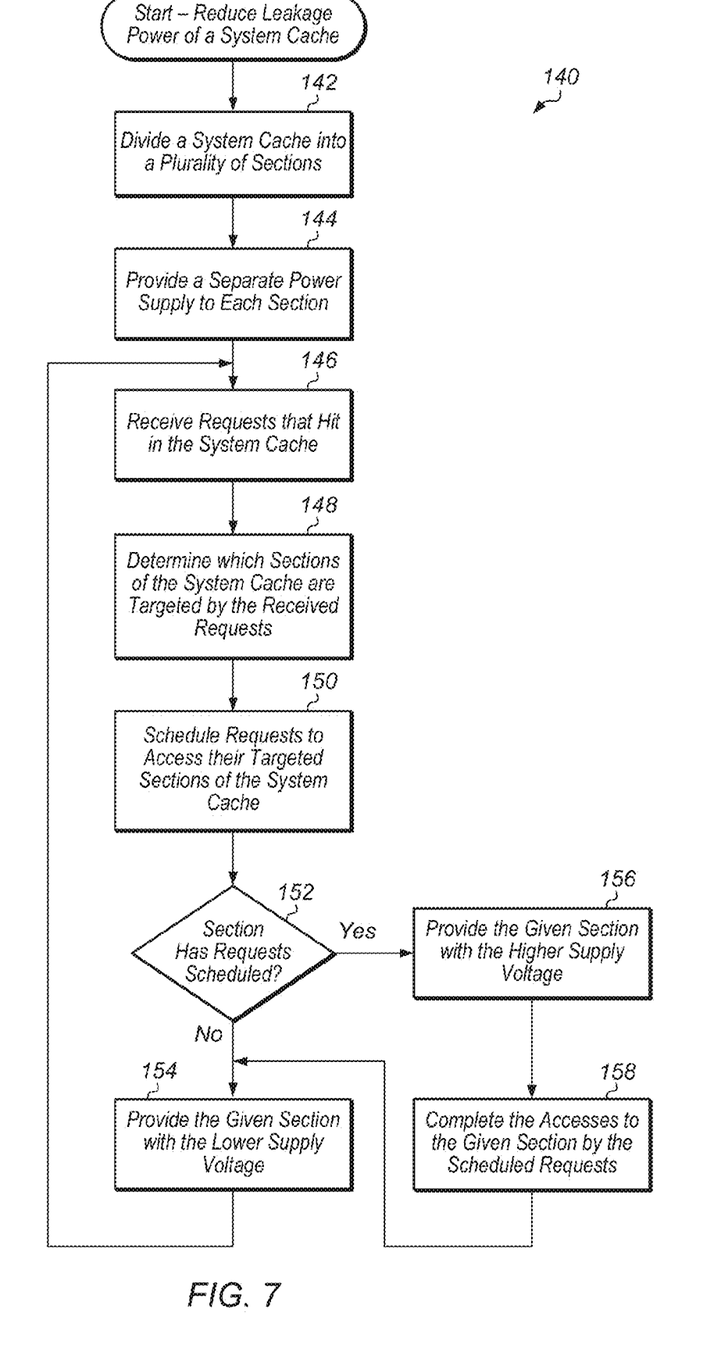
FIG. 7 is a generalized flow diagram illustrating one embodiment of a method for reducing leakage power of a system cache.

Referring now to FIG. 7, one embodiment of a method 140 for reducing leakage power of a system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a system cache may be divided into a plurality of sections (block 142). The number of sections used to partition the system cache may vary depending on the embodiment. For example, in one embodiment, a system cache may have a 4 megabyte (MB) capacity, and the system cache may be divided into 32 kilobyte (KB) sections. In other embodiments, the size of the system cache and sections may vary.

A separate power supply may be provided to power each section of the plurality of sections (block 144). In other words, each section of the system cache may have its own separately controllable power supply. Each power supply may be able to provide power at one of two voltages. The higher of the two voltages may be sufficient to allow the section to be accessed by a request that targets that particular section. The lower of the two voltages may be sufficient to allow the section to retain its stored data but may not be sufficient for allowing access to that particular section.

During operation of the system cache, requests may be received by the system cache and these requests may hit in the system cache (block 146). Based on the tag lookups of the requests, the cache control unit may determine which sections of the system cache are targeted by the received requests (block 148). Next, requests may be scheduled for access to the various targeted sections of the system cache (block 150). The manner in which requests are scheduled may vary depending on the embodiment. For example, in one embodiment, requests may be grouped together based on which section they target. For a group of requests that target a first section, the requests may be scheduled to access the first section in a burst of consecutive accesses. Other requests that target other sections may be delayed from accessing the other sections until all of the requests targeting the first section have been completed. Other techniques for scheduling requests to the various sections are possible and are contemplated.

When a given section does not have any requests scheduled for accessing the given section (conditional block 152, "no" leg), then the given section may be provided with the lower supply voltage (block 154). When a given section has one or more requests scheduled for access (conditional block 152, "yes" leg), then the given section may be provided with the higher supply voltage (block 156). Then, after the accesses to the given section by the requests have been completed (block 158), the given section may be provided with the lower supply voltage (block 154). After block 154, method 140 may return to block 146 to receive requests that hit in the system cache.

It is noted that steps 152, 154, 156, and 158 of method 140 may be performed in parallel for all of the sections of the system cache. In other words, each section may be independently managed. In various embodiment, the steps 152, 154, 156, and 158 of method 140 may be performed every 'X' number of clock cycles, wherein 'X' may vary from embodiment to embodiment. In these embodiments, a decision to maintain or change the voltage supplied to a given section may be made once every predetermined number of clock cycles.

Figure 8:
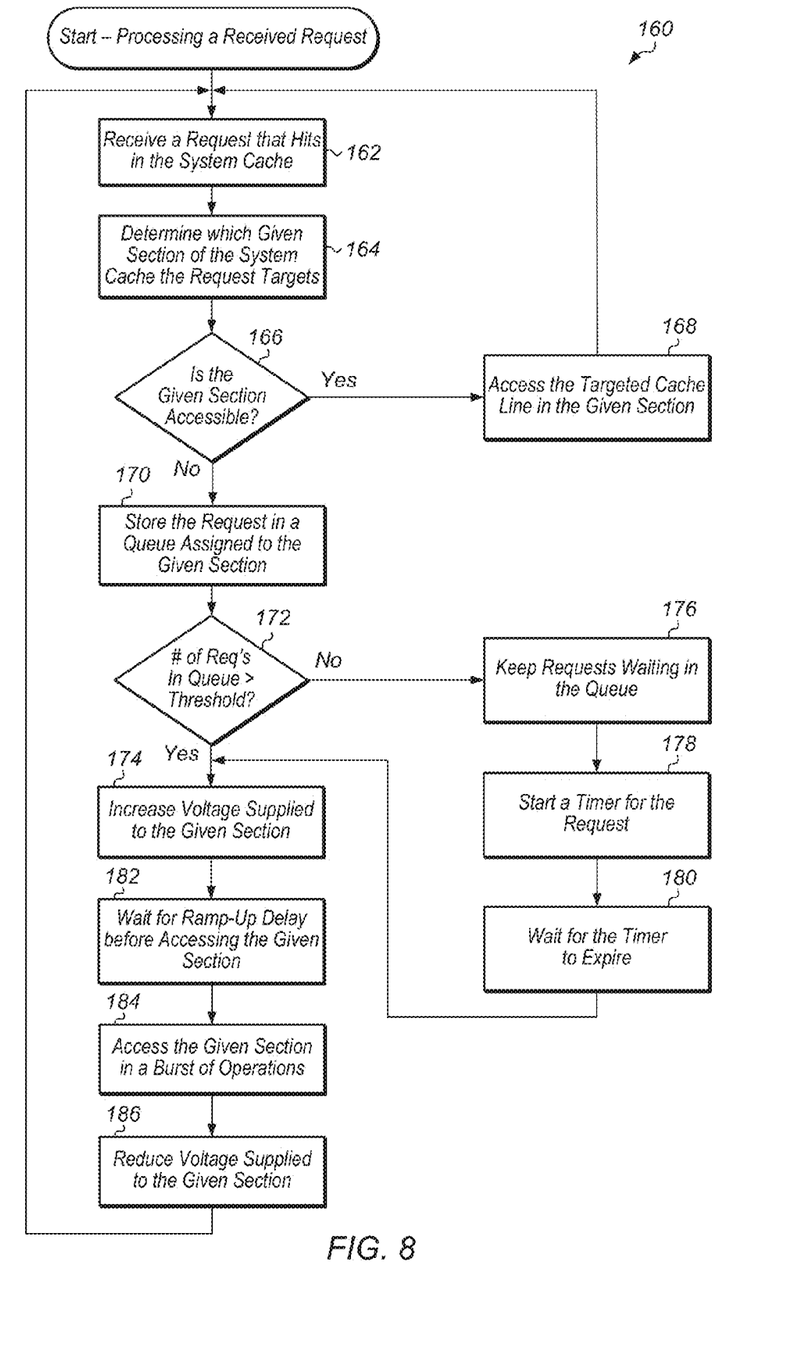
FIG. 8 is a generalized flow diagram illustrating one embodiment of a method for processing received requests in a system cache divided into sections.

Referring now to FIG. 8, one embodiment of a method 160 for processing a received request that hits in the system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A request may be received at a system cache and then the request may hit in the system cache (block 162). The request may be a memory access request generated by a requesting agent that is sent to the system cache prior to accessing memory. In one embodiment, the system cache may be divided into a plurality of equal-sized sections. The cache control unit may determine which given section of the system cache that the first request targets (block 164). Next, the cache control unit may check the status of the given section and determine if the given section is currently accessible (conditional block 166). The cache control unit may base this determination on the voltage being supplied to the given section. If the given section is being supplied with the lower retention voltage supply, then the given section may be considered inaccessible. If the given section is being supplied with the higher voltage supply, then the given section may be considered accessible.

If the given section is accessible (conditional block 166, "yes" leg), then the targeted cache line in the given section may be accessed (block 168). Following block 168, method 160 may return to block 162 and wait for the next request to hit in the system cache. In another embodiment, after block 168, if there are no other requests waiting to access the given section, then method 160 may jump to block 186 and reduce the voltage supplied to the given section.

If the given section is inaccessible (conditional block 166, "no" leg), then the request may be stored in a queue assigned to the given section (block 170). In some cases, the queue may already store other requests targeting the same given section. However, in some cases, the request may be the first request that is stored in this particular queue.

Next, it may be determined if the total number of requests that are stored in the queue assigned to the given section have reached a predetermined threshold (conditional block 172). If the number of requests in the queue have reached the threshold (conditional block 172, "yes" leg), then the voltage supplied to the given section may be increased to the higher voltage required to access the given section (block 174). If the number of requests in the queue is less than the threshold (conditional block 172, "no" leg), then the request(s) in the queue may continue to wait to access the given section (block 176). After block 176, a timer may be started for the request that was just stored in the queue (block 178). When the timer for this particular request expires (block 180), then the voltage supplied to the given section may be increased to the higher voltage (block 174). It is noted that the timer may expire at other points within method 160 than the spot indicated by block 180 in the figure. When a timer set for a specific request expires, the method may perform the step indicated in block 174, regardless of what step the method is currently implementing. In various embodiments, timer duration values may be based at least in part on process and/or temperature values. For example, a process used to manufacture a given chip may be identifiable via fuses or otherwise. Additionally, sensor data may be used to provide temperature values for a chip or portion of a chip. Based upon process and temperature characteristics, power consumption characteristics may be determined (e.g., experimentally during the design and manufacture process) and used to arrive at a suitable timer value. For example, the table below illustrates one possible embodiment of power consumption characteristics that corresponds to various combinations of process and temperature.

| Process/Temperature - Power Table | | | |
|---|---|---|---|
| | 25° C. | 50° C. | 75° C. |
| Alpha | $P_1$ | $P_2$ | $P_3$ |
| Beta | $P_4$ | $P_5$ | $P_3$ |
| Gamma | $P_7$ | $P_8$ | $P_9$ |

In the sample table above, processes Alpha, Beta and Gamma which may corresponding to various manufacturing processes are shown as corresponding to each of three rows. Also shown are various temperatures (25, 50 and 75 degrees Celsius) which correspond to each of three columns. As part of the production process, various power consumption characteristics may be detailed based on combinations of manufacturing processes and temperature. For example, a chip corresponding to the Alpha process when operating at 25° C. exhibits power consumption characteristics of $P_1$, wherein $P_N$ may represent any of a variety of power consumption characteristics such as overall power consumption, leakage current, power related to overhead associated with powering down, up, or both of one or more ways, and so on. Included in the $P_N$ data also be performance related characteristics. It is noted that $P_N$ may not be a single value, but could be multiple values representing a variety of characteristics. Utilizing such information, a timer value may be selected for how long a way is to be in a reduced power state. Such information may also be used to determine whether or not a way is to be placed in a reduced power state. Additional examples include using bandwidth as a factor in determining whether to place one or more ways in a reduced power state. For example, even though the table may indicate a reduced power state is desirable, if the bandwidth is currently high, a reduced power state may not be entered. Numerous such embodiments are possible and are contemplated.

After the voltage supplied to the given section has been increased to the higher voltage (block 174), a ramp-up delay may be allowed to elapse to let the given section reach the new voltage (block 182). After the given section has stabilized at the higher voltage, the request(s) stored in the queue may access the given section in a burst of operations (block 184). Then, after all requests waiting to access the given section of the system cache have completed, the voltage supplied to the given section may be reduced to the lower retention voltage (block 186). After block 186, the method 160 may return to block 162 and wait for the next request to hit in the system cache. It is noted that method 160 may be performed in parallel for each received request that hits in the system cache. As such, various requests may be processed simultaneously and multiple implementations of method 160 may be at different steps within method 160 at the same time.

Figure 9:
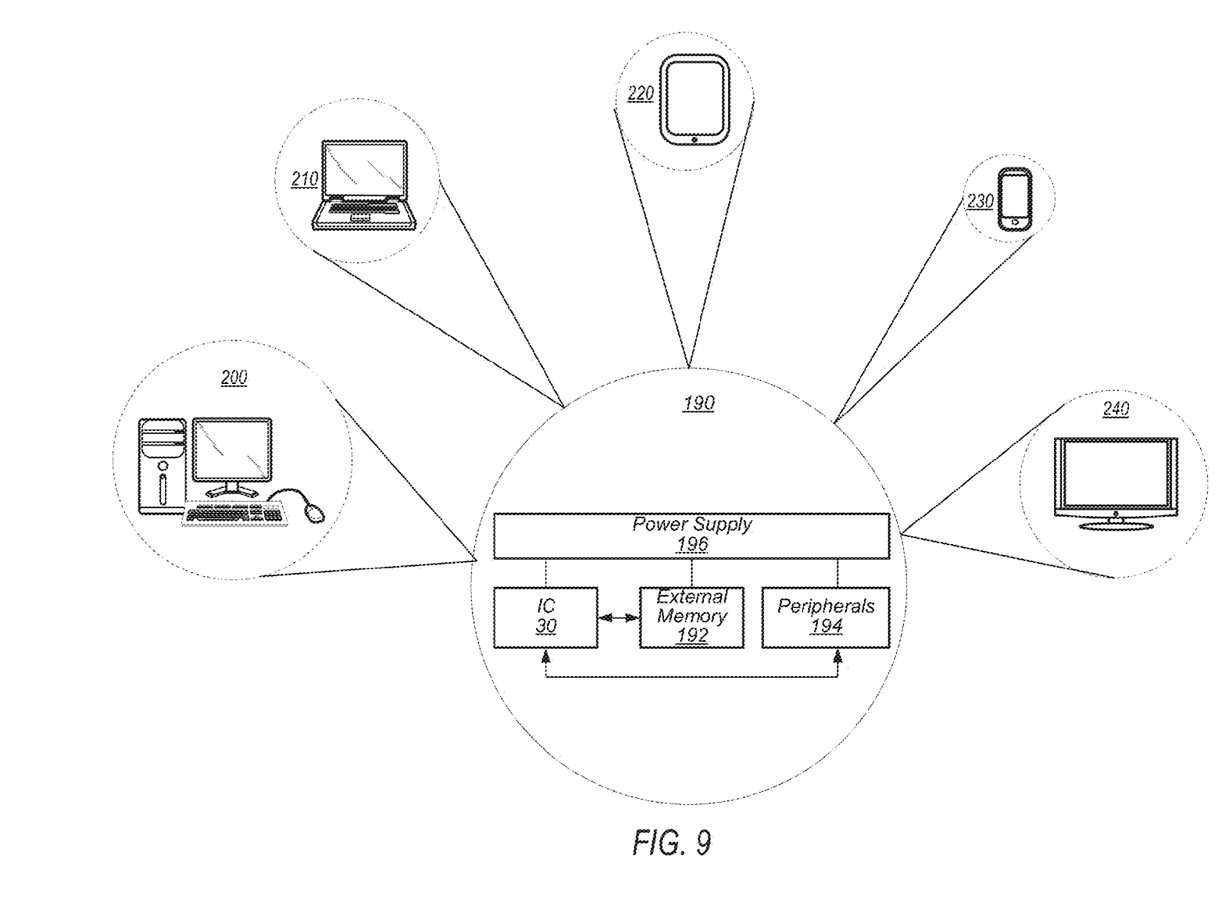
FIG. 9 is a block diagram of one embodiment of a system.

Referring next to FIG. 9, a block diagram of one embodiment of a system 190 is shown. As shown, system 190 may represent chip, circuitry, components, etc., of a desktop computer 200, laptop computer 210, tablet computer 220, cell phone 230, television 240 (or set top box configured to be coupled to a television), or otherwise. Other devices are possible and are contemplated. In the illustrated embodiment, the system 190 includes at least one instance of IC 30 (of FIG. 2) coupled to an external memory 192.

IC 30 is coupled to one or more peripherals 194 and the external memory 192. A power supply 196 is also provided which supplies the supply voltages to IC 30 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of IC 30 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache comprising:
    a cache memory comprising a plurality of sections, wherein each section of the plurality of sections has a separately controllable power supply; and
    a cache control unit, wherein the cache control unit is configured to:
        cause each section of the cache memory which is not being accessed to be supplied with a first supply voltage, wherein the first supply voltage is sufficient for the section to retain its stored data; and
        cause each section of the cache memory which is being accessed to be supplied with a second supply voltage, wherein the second supply voltage is higher than the first supply voltage, and wherein the second supply voltage is sufficient for a request to access the section;
    wherein the cache control unit is further configured to:
        receive requests which reference data stored in the cache memory; and
        group together requests according to which section is being targeted, wherein requests which target a given section are stored in a given queue.

2. The cache as recited in claim 1, wherein the cache control unit is configured to cause the given section to be supplied with the second supply voltage responsive to determining a number of requests which target the given section is above a threshold.

3. The cache as recited in claim 2, wherein requests that target other sections of the cache memory are prevented from accessing the cache memory until all requests stored in the given queue have finished accessing the given section of the cache memory.

4. The cache as recited in claim 3, wherein the cache control unit is further configured to decrease a voltage supplied to the given section to the first supply voltage responsive to determining all requests stored in the given queue have finished accessing the given section of the cache memory.

5. The cache as recited in claim 1, wherein the cache memory is a static random-access memory (SRAM).

6. A method comprising:
    receiving a first request at a system cache;
    determining the first request targets a first section of the system cache;
    storing the first request in a first queue responsive to determining the first section of the system cache is being supplied with a retention supply voltage, wherein the retention supply voltage is sufficient for the first section to retain data but not for the first section to be accessed;
    accessing the first section of the system cache for the first request responsive to determining the first section of the system cache is being supplied with an access supply voltage, wherein the access supply voltage is greater than the retention supply voltage.

7. The method as recited in claim 6, further comprising:
    receiving a second request at the system cache and determining the second request targets the first section of the system cache;
    storing the second request in the first queue responsive to determining the first section of the system cache is being supplied with a retention supply voltage; and
    supply the first section of the system cache with an access supply voltage responsive to determining the number of requests in the first queue has reached a predetermined threshold.

8. The method as recited in claim 7, wherein the access supply voltage is higher than the retention supply voltage.

9. The method as recited in claim 8, further comprising causing all requests stored in the first queue to successively access the first section of the system cache responsive to determining an activation delay has elapsed, wherein the activation delay allows the first section to ramp up to the access supply voltage from the retention supply voltage.

10. The method as recited in claim 8, wherein the system cache comprises a plurality of queues for storing requests that target sections that are supplied with the retention supply voltage.

11. The method as recited in claim 10, wherein prior to supplying the first section of the system cache with an access supply voltage, the method further comprising:
    receiving a third request at the system cache and determining the third request targets a second section of the system cache;
    causing the third request to access the second section of the system cache without first storing the third request in a queue, responsive to determining the second section is being supplied with the access supply voltage.

12. The method as recited in claim 9, wherein the first queue is configured to store requests that target the first section of the system cache.

13. A method comprising:
    dividing a system cache into a plurality of sections;
    providing a separate power supply to each section of the plurality of sections;
    receiving requests to the system cache and determining which sections are targeted by the received requests;
    providing a first voltage to a first section responsive to determining the first section is not being accessed, wherein the first voltage is sufficient for data retention but not for providing access to a request; and
    providing a second voltage to a second section responsive to determining the second section has one or more pending requests waiting for access, wherein the second voltage is sufficient for providing access to a request, and wherein the second voltage is higher than the first voltage.

14. The method as recited in claim 13, wherein the system cache comprises a plurality of ways, and wherein each way is divided into a plurality of sections.

15. The method as recited in claim 13, wherein pending requests to the second section are stored in a first queue until the power supply of the second section has reached the second voltage.

16. The method as recited in claim 14, further comprising providing the second voltage to the second section responsive to determining a number of pending requests waiting for access to the second section is greater than a predetermined threshold.

17. The method as recited in claim 15, further comprising causing the pending requests to access the second section responsive to the power supply of the second section reaching the second voltage.

18. The method as recited in claim 17, further comprising reducing the power supply of the second section to the first voltage responsive to determining the pending requests have finished accessing the second section.

19. A memory controller comprising a system cache, wherein the system cache comprises:
 a data memory configured to store a plurality of cache lines, wherein the data memory is divided into a plurality of sections, and wherein each section has a separate power supply;
 a tag memory configured to store a plurality of tags corresponding to the plurality of cache lines in the plurality of sections; and
 a control unit configured to:
  cause each section that is not being accessed to be supplied with a first voltage, wherein the first voltage is sufficient for data retention;
  group requests together based on which section of the data memory the requests target; and
  cause the first voltage to be increased to a second voltage for a given section, responsive to determining a number of requests waiting for access to the given section is above a threshold.

20. The memory controller as recited in claim 19, wherein the control unit is further configured to cause the number of requests waiting for the given section to access the given section after waiting for a predetermined period of time to elapse following the increase of the given section's power supply to the second voltage.

21. The memory controller as recited in claim 20, wherein the control unit is further configured to reduce the power supply of the given section to the first voltage responsive to determining no more requests are waiting to access the given section.

22. The memory controller as recited in claim 19, further comprising a plurality of queues for storing incoming requests, wherein requests waiting for access to the given section are stored in a first queue.

23. The memory controller as recited in claim 22, wherein the control unit is further configured to determine which section of the data memory the given request targets based on a result of a tag lookup.

* * * * *